United States Patent [19]
Saito et al.

[11] Patent Number: 5,323,312
[45] Date of Patent: Jun. 21, 1994

[54] SPECIFIC LAYOUT STRUCTURE GENERATING METHOD AND STRUCTURED DOCUMENT LAYOUT PROCESSING AND DEVICE FOR CARRYING OUT THE SAME

[75] Inventors: Kazuo Saito; Naoki Hayashi, both of Tokyo, Japan

[73] Assignee: Fuji Xerox Co., Ltd.

[21] Appl. No.: 713,735

[22] Filed: Jun. 11, 1991

[30] Foreign Application Priority Data

Jun. 15, 1990 [JP] Japan .................................. 2-157067

[51] Int. Cl.$^5$ ............................................ G06F 15/21
[52] U.S. Cl. ................................................ 364/419.1
[58] Field of Search ...................... 364/419.1, 419.01; 395/600, 148, 145, 146

[56] References Cited
PUBLICATIONS

ISO 8613: Information Processing-Text and Office System-Office Document Architecture (ODA) and Interchange Format, International Standard, 1989, pp. 2–109.
"A Method of Document Layout Process Based on ODA (1)-Issues on Backtrack-," pp. 598–599, reported by Murakami, et al., at the 40th (first half of 1990) General Meeting of The Information Processing Society.

*Primary Examiner*—Gail O. Hayes

[57] ABSTRACT

In a document layout processing device according to the invention, when the layout structure of a particular document is generated on the basis of a limitation of a layout structure common to a plurality of documents, a generating unit generates a data structure corresponding to a subordinate structure and holding information about the generation of the subordinate structure in association with a superior element having the subordinate structure, the subordinate structure including at least one element which can be generated as an element immediately subordinate to the superior element among elements constituting the layout structure common to the plurality of documents. The data structure is memorized in a memory. A selecting unit selects a subordinate element on the basis of the content of the particular document and information about the generation of the subordinate structure of the date structure and holds a selection history of the selected subordinate element in the data structure. If a failure occurs in layout, the selecting unit preferentially selects a subordinate element which can be generated in association with a superior element which has caused the failure, on the basis of a selection history of a data structure corresponding to the superior element.

12 Claims, 9 Drawing Sheets

FIG.6 *(PRIOR ART)*

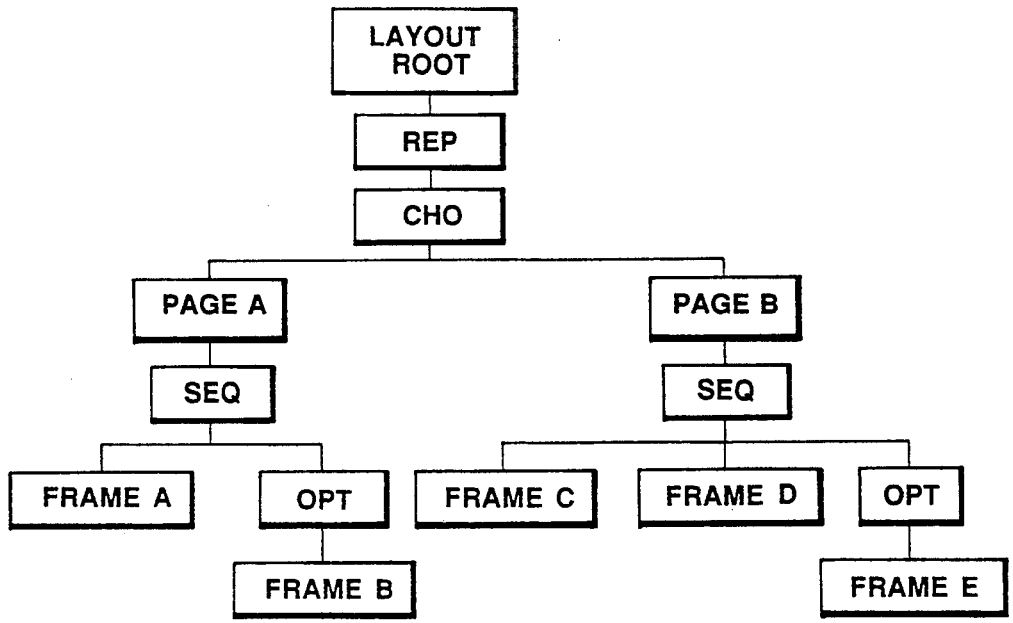
FIG. 8 *(PRIOR ART)*
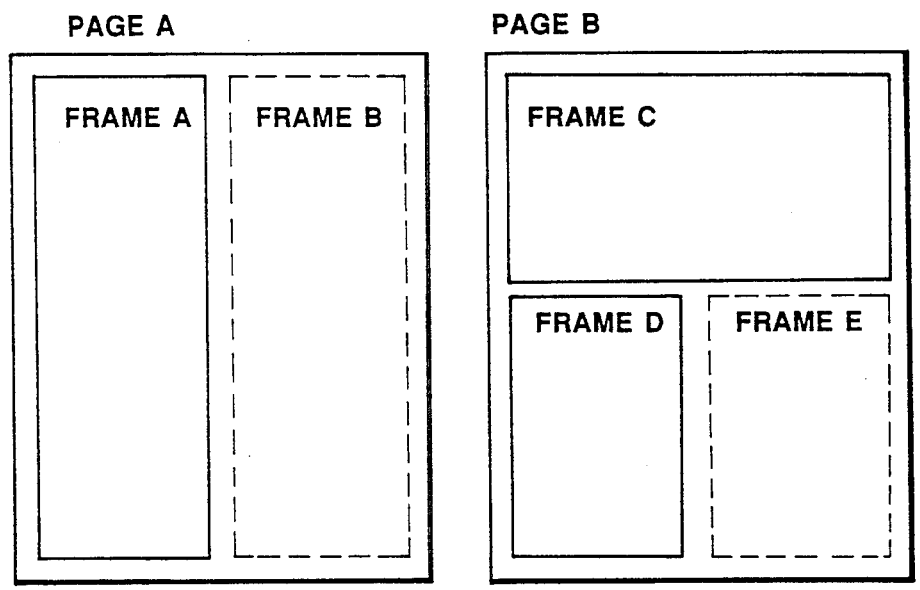
FIG. 9 *(PRIOR ART)*

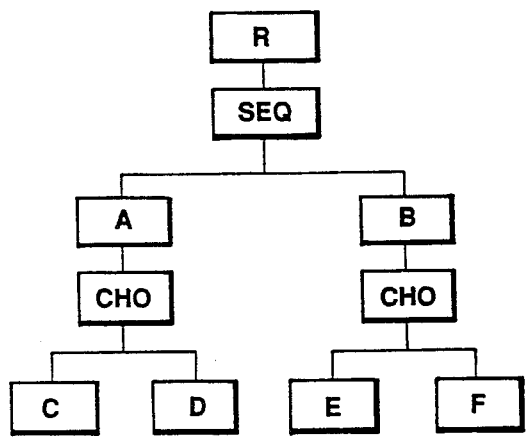
FIG. 10 *(PRIOR ART)*
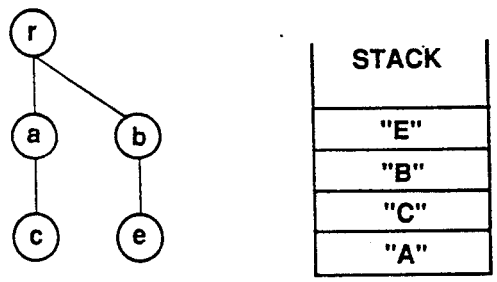
FIG. 11(a) FIG. 11(b)
*(PRIOR ART) (PRIOR ART)*
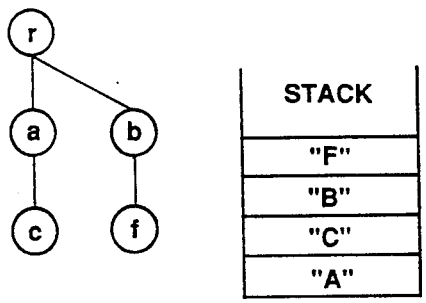 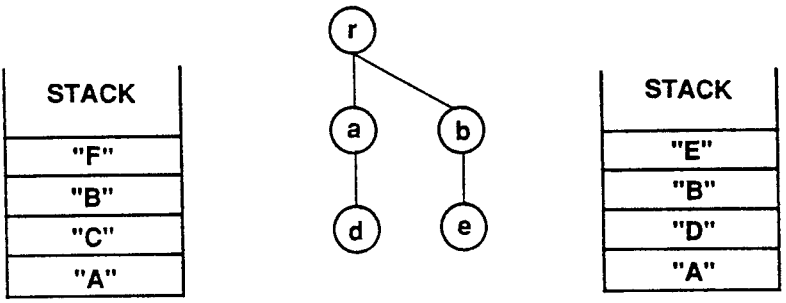
FIG. 12(a)   FIG. 12(c)
*(PRIOR ART)*   *(PRIOR ART)*
  FIG. 12(b)   FIG. 12(d)
  *(PRIOR ART)*   *(PRIOR ART)*

SPECIFIC LAYOUT STRUCTURE GENERATING METHOD AND STRUCTURED DOCUMENT LAYOUT PROCESSING AND DEVICE FOR CARRYING OUT THE SAME

BACKGROUND OF THE INVENTION

1. Field of the Invention

The present invention relates to a document layout processing method for generating a specific layout structure on the basis of a generic layout structure and the content of a particular document to be laid out, and to a device for carrying out such a method.

2. Description of the Related Art

In recent years, it has been proposed to perform layout of a document (document processing) on the basis of the concept of a so-called structured document according to which one document is handled as a combination of a logical structure based on its sections and paragraphs and a layout structure which represents how the content of the document is to be actually arranged.

One example of document layout processing has recently been realized which is based on an office document architecture (hereinafter referred to as the "ODA") (ODA=ISO 8613: Information Process-Text and Office System-Office Document Architecture (ODA) and Interchange Format (1989)) which belongs to the system of OSI (Open System Interconnection) proposed by the ISO (International Standards Organization).

According to the ODA, one document has, in addition to its layout structure, a logical structure which represents a structure obtained by logically grasping sections, paragraphs and the like. The content of a particular document is linked to logical objects positioned at the lowest level of a specific logical structure. FIG. 6 shows the relation between the specific logical structure and the document content linked thereto. In FIG. 6, the upper and lower portions with respect to the chain line indicated by an arrow A correspond to the specific logical structure and the document content, respectively.

The ODA enables automatic layout processing which automatically generates a specific layout structure permitted by a generic layout structure, according to document contents linked to a specific logical structure, and links the specific logical structure to the specific layout structure via the document contents. To automatically generate the specific layout structure according to the document contents linked to the specific logical structure indicates a series of manipulations, for example, a process in which if a certain document content is not completely laid out in a subordinate structure of a certain page object, a new page object is automatically generated and the overflown document content is laid out in the new page object.

FIG. 7 shows an example of a structure in which a document corresponding to the specific logical structure shown in FIG. 6 is laid out. In FIG. 7, the upper portion with respect to the chain line indicated by the arrow A corresponds to the specific logical structure, while the lower portion with respect to the chain line indicated by an arrow B corresponds to the specific layout structure. The example of FIG. 7 shows a case where although the content of Paragraph 2.1 of Section 2 is to be laid out on a first page, the content is too long to be laid out within the first page so that the content of Paragraph 2.1 of Section 2 is divided into halves and the latter half is laid out on a second page.

It is to be noted that, according to the ODA, each layout object class in the generic layout structure has an expression called a structure expression as an attribute "generator for subordinates" (hereinafter referred to as a "GFS") to represent a specific layout structure which can be generated. The structure expression is an expression representative of limitations of a structure immediately subordinate to a layout object belonging to a corresponding layout object class. The structure expression consists of a combination of a term SEQ, AGG, CHO, REP and an object class identifier (hereinafter referred to as a "class ID").

The meaning of each of the terms will be described below.

It is assumed here that "a" and "b" indicate layout objects belonging to classes identified by the class IDs "A" and "B", respectively.

(1) The class ID is a symbol for primarily identifying each class within the generic layout structure.

(2) If a structure expression containing the class ID term is evaluated, one layout object belonging to a layout object class indicated by the class ID is generated as the evaluation result of the class ID term.

(3) If a structure expression containing the term SEQ is evaluated, the evaluation result of terms which follow the term SEQ indicates that the evaluated terms are linked in that order.

For example, the evaluation result of the structure expression (SEQ A B) is (a b).

(4) If a structure expression containing the term AGG is evaluated, the evaluation result of terms which follow the term AGG indicates that the evaluated terms are linked in arbitrary order.

For example, the evaluation result of the structure expression (AGG A B) is (A B) or (b a).

(5) If a structure expression containing the term CHO is evaluated, the evaluation result of terms which follow the term CHO indicates that any one of the evaluated terms is selected.

For example, the evaluation result of the structure expression (CHO A B) is (a) or (b).

(6) If a structure expression containing the term OPT is evaluated, the evaluation result is either an evaluated term which follows the term OPT or nothing.

For example, the evaluation result of the structure expression (OPT A) is (a) or "nothing".

(7) If a structure expression containing the term REP is evaluated, the evaluation result indicates that an evaluated term which follows the term REP is repeated once or an arbitrary number of times more than once.

For example, the evaluation result of the structure expression (REP A) is (a), (a a), (a a a), . . . , or (a a . . . a).

In addition, such a structure expression can be represented as a combination of terms selected from the aforesaid terms, for example, in the form of (SEQ(CHO A B)(OPT C)). The evaluation result of the structure expression (SEQ(CHO A B)(OPT C)) is (a), (a c), (b) or (b c). Each layout object class in the generic layout structure has any of the above-described structure expressions in its GFS.

Regarding the kind of immediately subordinate object which can be linked to a layout object belonging to a certain class, the layout object is limited by the structure expression contained in the GFS of the certain class. In other words, an object corresponding to any of the evaluation results of the structure expression can only be immediately linked to the layout object as a subordinate object. For example, if a layout object class whose class ID is "X" has the structure expression (SEQ(CHO A B)(OPT C)) in its GFS, the object a can be immediately linked to an object x which belongs to the layout object class having the class ID "X", but it is impossible to link both of the objects a and b to the same.

As described above, the generic layout structure is represented by a combination of an operator called a structure generator and a frame class representing the template of an actual frame. FIG. 8 shows one example of the generic layout structure, and FIG. 9 shows a layout image represented by the generic layout structure.

As a related art concerning document processing (hereinafter referred as "layout processing") which utilizes a generic structure and a specific structure to generate a specific layout structure on the basis of a document content and a generic layout structure, there is a method of sequentially generating the specific layout structure by sequentially trying a plurality of choices related to structure generation which are described in the generic layout structure. In such a method, a desired part of a document content is laid out in accordance with one choice selected from among the choices in a predetermined order. Layout processing is achieved, for example, by performing sequential selection from the plurality of choices related to the structure generation of each class on the basis of left-depth-first-search.

FIG. 11(a) shows one example of a specific layout structure corresponding to the generic layout structure shown in FIG. 10. The shown specific layout structure is obtained by performing selection from the choices of the generic layout structure on the basis of left-depth-first-search.

It is assumed here that a, b, c, d, e and f respectively denote layout objects belonging to individual object classes whose class IDs are R, A, B, C, D, E and F. Since the object classes individually serve as choices, they are hereinafter referred to as choices R, A, B, C, D, E and F, respectively.

When the specific layout structure (refer to FIG. 11(a)) is generated, information is stored into a stack which information indicates that a certain layout object class was selected at the time when a particular choice among the plurality of choices was processed. FIG. 11(b) shows the content of the stack obtained when the specific layout structure shown in FIG. 11(a) is generated. In FIG. 11(b), "A", "C","B" and "E" respectively denote information indicating that the choices A, C, B and E have been selected.

If the layout fails, the next choice is selected in a predetermined order (the uppermost information in the stack shown in FIG. 11(b) is restored and another choice is selected), thereby again carrying out layout processing. At this time, to cancel the specific layout structure generated according to the immediately previous choice, generation and deletion of layout objects are performed so as to match the state of the layout to the new choice.

In the above-described conventional layout method, however, when the specific layout structure is generated, the information must be stored into the stack which information indicates that the certain layout object class was selected at the time when the particular choice among the plurality of choices was processed. If the layout fails, it is necessary to perform a retry of a new layout by restoring the uppermost information in the stack and selecting another choice.

The following description is made of a retry of layout which is performed when the layout of the choice C has failed, for example, in the specific layout structure shown in FIG. 11(a).

The state of the stack before the retry is as shown in FIG. 11(b). Therefore, the uppermost information "E" is first obtained, then the stack is restored to the state wherein it was placed before the choice E was laid out, on the basis of the information "E", and then the choice F is selected instead of the choice E, whereby a new specific layout structure can be obtained. FIG. 12(a) shows the specific layout structure obtained by performing such a retry. FIG. 12(b) shows the state of the stack obtained by performing the retry. In FIG. 12(b), "F" represents information indicating that the choice F has been selected. In this case as well, however, the layout fails since an alternative candidate (the choice D) for the choice C has not been selected.

Subsequently, the uppermost information "F" is obtained by further making reference to the content of the stack shown in FIG. 12(b), then the stack is restored to the state wherein it was placed before the choice F was laid out, on the basis of the information "F" (in this case, the stack is restored to the state wherein it was placed when the choice A was laid out, due to limitations of the generic layout structure) and then the choice D is selected instead of the choice C, whereby a new specific layout structure can be obtained. FIG. 12(c) shows the specific layout structure obtained by performing such a retry. FIG. 12(d) shows the state of the stack obtained by performing the retry. In FIG. 12(d), "D" represents information indicating that the choice D has been selected.

As is apparent from the foregoing description, according to the conventional layout method, to cancel a specific layout structure generated according to an immediately previous choice, it is necessary to frequently perform generation and deletion of layout objects so as to match the state of a layout to a new choice. As a result, it is difficult to achieve layout processing with high efficiency.

SUMMARY OF THE INVENTION

It is, therefore, an object of the present invention to provide a document layout processing method and a device for carrying out the same, both of which can improve the efficiency of layout processing of a layout structure corresponding to a particular document.

It is another object of the present invention to provide a document layout processing method and a device for carrying out the same, both of which can reduce an overhead by restraining generation and deletion of unnecessary layout objects during the generation of a layout structure corresponding to a particular document.

It is another object of the present invention to provide a document layout processing method and a device for carrying out the same, both of which can rapidly effect retry processing of a layout during the generation of a layout structure corresponding to a particular document.

It is another object of the present invention to provide a document layout processing method and a device for carrying out the same, both of which can rapidly effect generation and editing of a document according to a preset format.

To achieve the above objects, in accordance with a first aspect of the present invention, a data structure corresponding to a subordinate structure is generated in association with a superior element having the subordinate structure, the subordinate structure including at least one element which can be generated as an element immediately subordinate to the superior element among elements constituting a layout structure common to a plurality of documents. The data structure is held, and an immediately subordinate element is selected on the basis of the data structure and the content of the particular document.

In accordance with the first aspect of the present invention, when an element immediately subordinate to a certain superior element is to be generated, a data structure corresponding to a subordinate structure is generated in association with the certain superior element having the subordinate structure, the subordinate structure including at least one element which can be generated as an element immediately subordinate to the certain superior element. By making reference to the data structure, it is possible to easily determine what subordinate element exists in association with the certain superior element and also whether the subordinate element can be generated.

To achieve the above objects, in accordance with a second aspect of the present invention, there is provided a document layout generating device which comprises generating means for generating a data structure corresponding to a subordinate structure in association with a superior element having the subordinate structure, the subordinate structure including at least one element which can be generated as an element immediate subordinate to the superior element among elements constituting a layout structure common to a plurality of documents; memory means for memorizing the data structure generated by the generating means; and selecting means for selecting an immediately subordinate element on the basis of the data structure memorized in the memory means on the basis of a content of a particular document to be laid out.

In accordance with the second aspect of the present invention, the immediately subordinate structure associated with the content of the document to be laid out is selected on the basis of the data structure which corresponds to the subordinate structure including at least one immediately subordinate element which can be generated in association with the certain superior element. If a failure occurs in layout, an immediately subordinate element other than a subordinate element which has caused the failure is preferentially selected. Accordingly, it is possible to rapidly effect retry processing for layout.

The other objects, features and advantages of the present invention will become apparent from the following detailed description taken in conjunction with the accompanying drawings.

BRIEF DESCRIPTION OF THE DRAWINGS

FIG. 8 is a diagram showing one example of a generic layout structure in the ODA;

FIG. 9 is a view showing one example of a layout image represented by the generic layout structure shown in FIG. 8; and FIGS. 10, 11a–b, and 12a–d are views for explaining conventional document layout processing.

DESCRIPTION OF THE PREFERRED EMBODIMENT

A preferred embodiment of the present invention will be described below with reference to the accompanying drawings.

Figure 1:
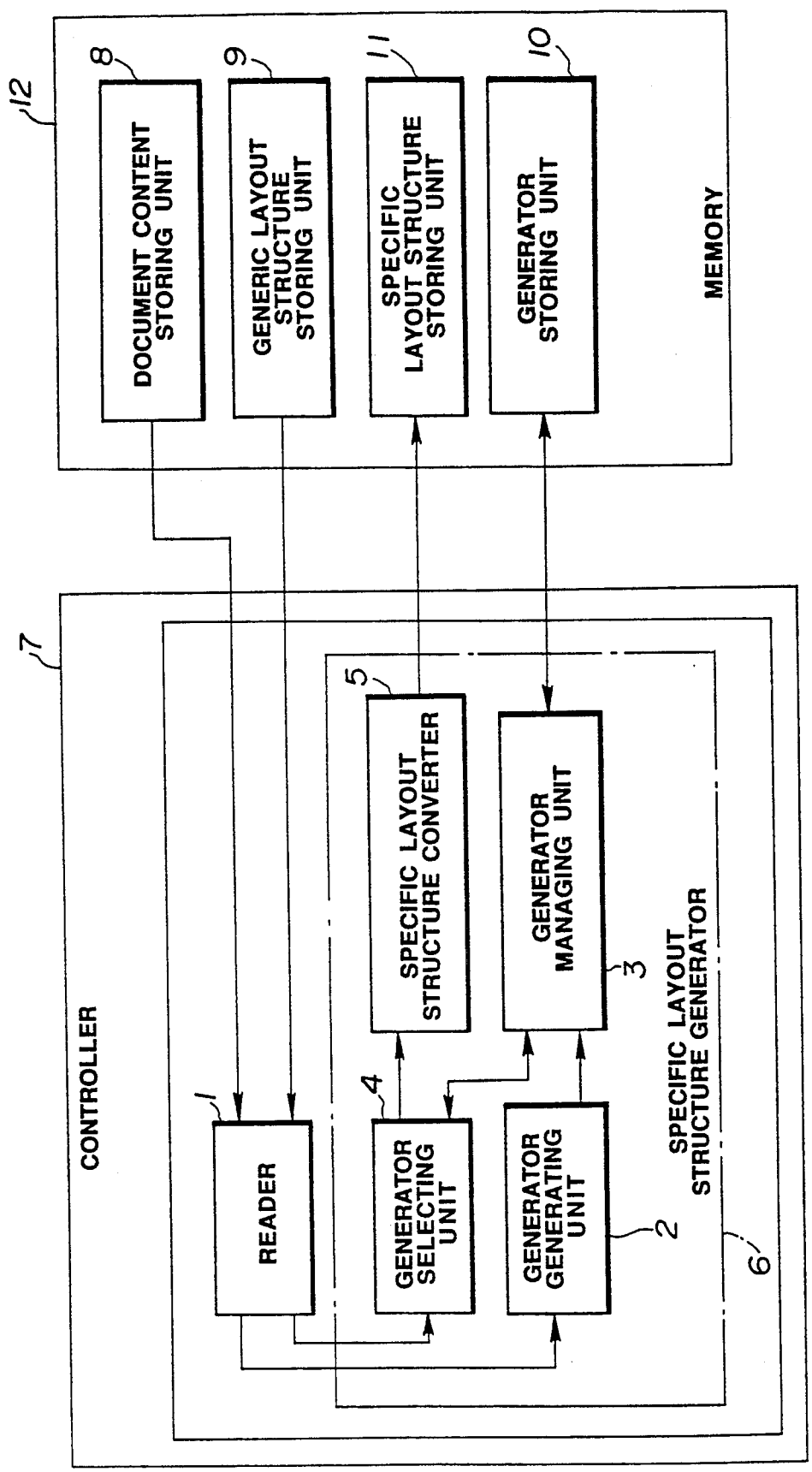
FIG. 1 is a block diagram schematically showing one embodiment of a document layout processing device according to the present invention.

FIG. 1 is a block diagram showing one embodiment of a document layout processing device according to the present invention. The device according to the embodiment shown in FIG. 1 can be applied to an apparatus for performing document layout processing based on the above-described ODA (office document architecture).

Referring to FIG. 1, the document layout processing device comprises a controller 7 and a memory 12. The controller 7 includes a reader 1 and a specific layout structure generator 6 for generating a specific layout structure on the basis of the content of a document and a generic layout structure. The specific structure generator 6 includes a generator generating unit 2, a generator managing unit 3, a generator selecting unit 4 and a specific layout structure converter 5. The memory 12 includes a document content storing unit 8 for storing the content of the document, a generic layout structure storing unit 9 for storing the generic layout structure, a generator storing unit 10 for storing a generator which will be described later, and a specific layout structure storing unit 11 for storing the specific layout structure.

The controller 7 is constituted by a central processing unit and the like, and the memory 12 is constituted by a main memory, a hard disk and the like.

The reader 1 reads a generic layout structure from the generic layout structure storing unit 9 and outputs the generic layout structure to the generator generating unit 2. The reader 1 also reads the content of a document to be laid out from the document content storing unit 8 and outputs the document content to the generator selecting unit 4.

The generator generating unit 2 has the functions of the generating means described previously, and generates a data structure representative of both the selection history of a subordinate structure and information about the generation of the subordinate structure in association with a superior element having the subordinate structure as a subordinate structure which can be generated in a generic layout structure.

In this embodiment, it is assumed that the data structure is defined as a generator. As described in detail later, the generator necessarily accompanies a layout object having a subordinate structure, and is generated in association with the layout object having the subordinate structure. The layout object corresponds to a page or a frame.

Figure 2:
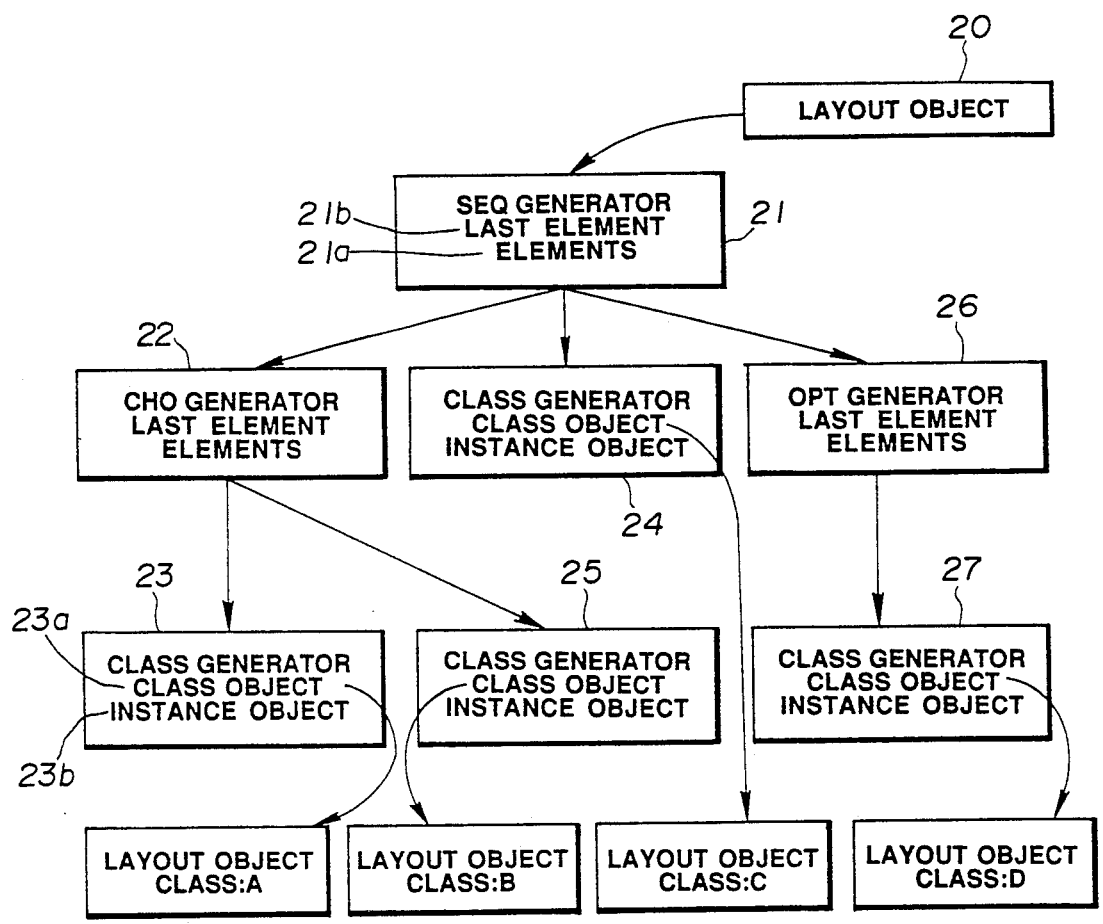
FIG. 2 is a structure diagram showing one example of a data structure.

FIG. 2 is a diagram showing one example of the internal structure of a generator in which a layout object class corresponding to a layout object (element) having a subordinate structure which can be generated has the structure expression (SEQ (CHO A B) C (OPT D)) in its GFS (attribute: generator for subordinates).

In the structure expression (SEQ (CHO A B) C (OPT D)), A, B, C and D represent object classes, respectively. In this case, the kinds of specific layout structures permitted as a whole are (A C), (B C), (A C D) and (B C D).

In FIG. 2, a generator related to generation of the subordinate structure of a layout object 20 is composed of constituent elements, i.e., generators 21 to 27 which are functional units. In this example, the hierarchy of the generators has a three-level structure, and the Class generators 23, 24, 25 and 27 indicate layout class objects, respectively.

In the description of this embodiment, to discriminate between the generator related to the generation of the subordinate structure and the generators (constituent elements) which constitute the former generator, the generators serving as the constituent elements are hereinafter called "element generators".

The generator managing unit 3 stores a generator generated by the generator generating unit 2 into the generator storing unit 10, and reads a generator from the generator storing unit 10 and temporarily memorizes the read generator.

The generator selecting unit 4 has the function of the selecting means described previously, and selects element generators from among the generators memorized in the generator managing unit 3 in accordance with the content of a document to be laid out. From among the element generators selected by the generator selecting unit 4, a Class generator generates a desired layout object.

The specific layout structure converter 5 temporarily memorizes the layout objects generated by the generator selecting unit 4, and stores the memorized final specific layout structure into the specific layout structure storing unit 11.

The internal structure of the generator will be described below in detail.

The generator, which necessarily accompanies an object having a subordinate structure, has a complicated structure and is structured according to a subordinate-element generator. The subordinate-element generator determines what layout object or what combination of layout objects is possible at a level subordinate to a specific layout object. The subordinate-element generator is represented as an expression (structure expression) using a combination of a layout object class representing the template of an actual frame and one or more of six subordinate-element generator operators called structure generators including SEQ, AGG, OPT, REP, OPTREP and CHO. Each of the subordinate-element generator operators is defined as follows.

SEQ . . . A plurality of elements (layout objects) which follow this operator must exist in a specified order.

AGG . . . A plurality of elements (layout objects) which follow this operator must exist in an arbitrary order.

CHO . . . From among a plurality of elements (layout objects) which follow this operator, one arbitrary element must exist.

OPT . . . One element (layout object) which follows this operator may or may not exist.

REP . . . One element (layout object) which follows this operator must be repeated once or more times.

OPTREP . . . One element (layout object) which follows this operator must be repeated zero or more times.

Accordingly, the aforesaid six kinds of subordinate-element generators SEQ, AGG, OPT, REP, OPTREP and CHO as well as a Class type representative of a layout object class, that is, a total of seven kinds of element generators which constitutes the generator, are prepared.

The element generators serving as the respective subordinate-element generators have a substantially identical internal construction. For example, the SEQ generator 21 shown in FIG. 2 includes a subordinate-element holding unit (hereinafter referred to as "elements") 21a, a generation history holding unit (hereinafter referred to as a "lastElement") 21b, and a not shown superior generator (hereinafter referred to as a "superior"). The "elements"21a hold element information indicative of the immediately subordinate element generator of the element generator of their own. The "lastElement" 21b holds element information indicative of a currently selected element (subordinate-element generator) from among the element information held in the "elements" 21a. The "superior" holds information indicative of the immediately superior element generator of the element generator of its own.

The AGG generator has, in addition to the aforesaid construction, a selected-element holding unit (hereinafter referred to as "selectedElements") for holding information indicative of a selected element. If the pattern of array of element information within the "elements" is, for example, (a, b, c), the elements a, b and c can be combined in a number of ways such as (a, b, c), (a, c, b), (b, a, c), . . . From among such combination patterns, a tried pattern is held in the "selectedElements".

The Class type has an internal construction such as that of the Class generator 23 shown in FIG. 2. The Class generator 23 includes a layout object class holding unit (hereinafter referred to as a "classObject") 23a for holding a layout object class and an instance holding unit (hereinafter referred to as an "instanceObject") 23b for holding an instance.

Each of the above-described element generators is constructed to have two major functions:

I) the function of generating a new layout object subordinate to a certain layout object (hereinafter referred to as a "generate (function)"); and II) the function of generating an object alternative to a certain layout object which has been generated at a level subordinate to a certain layout object (hereinafter referred to as an "alternative (function)".

The processing algorithm of each of the element generators will be described below in connection with each of the generate function and the alternative function.

Generate Function

Basically, the generate function generates a layout object one by one at a level subordinate to its corresponding layout object. If the generation succeeds, each generated layout object is returned as a returned value.

If the generation fails (in a case where all layout objects have completely been generated), failure information indicative of the failure (hereinafter referred to as "failure") is returned as a returned value.

The generate function of each of the element generators will be described below.

1: SEQ generator

1) If no evaluation has yet been executed, first information in the array of element information held in the "elements" is set in the "lastElement", and the generate function is transferred to an element generator corresponding to the element information. The obtained result is returned as a returned value.

2) If element information has been set in the "lastElement", the generate function is transferred to an element generator corresponding to the element information. If the generation of a layout object succeeds, the generated layout object is returned as a returned value. If the generation of the layout object fails, element information next to immediately previous element information in the array of element information held in the "elements" is set in the "lastElement", and the generate function is transferred to an element generator corresponding to the element information. The obtained result is returned as a returned value. If the element information set in the "lastElement" is the last element information in the array of element information held in the "elements", no further generation is possible and "failure" is returned as a returned value.

2: AGG generator

1) If no evaluation has yet been executed, first information in the array of element information held in the "elements" is set in the "lastElement", and the generate function is transferred to an element generator corresponding to the element information. The obtained result is returned as a returned value.

2) If element information has been set in the "lastElement", the generate function is transferred to an element generator corresponding to the element information. If the generation of a layout object succeeds, the generated layout object is returned as a returned value. If the generation of the layout object fails, element information next to immediately previous element information in the array of element information held in the "elements" is set in the "lastElement", and the generate function is transferred to an element generator corresponding to the element information. The obtained result is returned as a returned value. If the element information set in the "lastElement" is the last element information in the array of element information held in the "elements", no further generation is possible and "failure" is returned as a returned value.

3: CHO generator

1) If no evaluation has yet been executed, first information in the array of element information held in the "elements" is set in the "lastElement", and the generate function is transferred to an element generator corresponding to the element information. The obtained result is returned as a returned value.

2) If element information has been set in the "lastElement", the generate function is transferred to an element generator corresponding to the element information, and the obtained result is returned as a returned value.

4: OPT generator

1) If no evaluation has yet been executed, first information in the array of element information held in the "elements" is set in the "lastElement", and the generate function is transferred to an element generator corresponding to the element information. The obtained result is returned as a returned value.

2) If element information has been set in the "lastElement", the generate function is transferred to an element generator corresponding to the element information, and the obtained result is returned as a returned value.

5: REP generator

1) If no evaluation has yet been executed, first information in the array of element information held in the "elements" is set in the "lastElement", and a new element generator is created (a copy is produced of an element generator corresponding to initial element information in the array of element information in the "elements"). Element information indicative of the new element generator is supplied to the "elements". Subsequently, the generate function is transferred to an element generator corresponding to the element information set in the "lastElement", and the obtained result is returned as a returned value.

2) If element information has been set in the "lastElement", the generate function is transferred to an element generator corresponding to the element information. If the generation of a layout object succeeds, the generated layout object is returned as a returned value. If the generation of the layout object fails, the last element information in the array of element information held in the "elements" is set in the "lastElement". Then, a new element generator is created (a copy is produced of an element generator corresponding to initial element information in the array of element information in the "elements"). Element information indicative of the new element generator is supplied to the "elements". Subsequently, the generate function is transferred to an element generator corresponding to the element information set in the "lastElement", and the obtained result is returned as a returned value.

6: OPTREP generator

The OPTREP generator performs the same processing as the REP generator does.

7: Class generator

1) If no evaluation has yet been executed, an instance is generated from a layout object class held in the "classObject" and this instance is set in the "instanceObject". The instance is returned as a returned value.

2) If evaluation has already been executed, "failure" is returned.

Alternative Function

Basically, the alternative function generates a layout object alternative to a specified layout object which has been generated at a level subordinate to a certain layout object. The generated subordinate layout object is passed as an argument and a candidate for this layout object is searched. If the generation of a layout object succeeds, the generated layout object is returned as a returned value. If the generation of the layout object fails, "failure" is returned as a returned value. In a case where no alternative candidate is found within the element generator but a superior element generator may be able to find the candidate, information "obscurity" indicative of an obscure state (hereinafter referred to as "obscurity") is returned as a returned value.

Basically, the Class generator performs the following processing.

I) Restoration Processing ... The internal state of the generator is restored to the state wherein the generator was placed immediately after a layout object passed as an argument of the "alternative" had been generated.

Referring to the outline of the restoration algorithm of the restoration processing, a Class generator which has generated the layout object passed by the "alternative" is searched and information is sequentially reset while reference is being made to the inside of "elements" while tracing "superiors" to the root element generator of the Class generator (element generator). The resetting is performed only in the case of SEQ, AGG, REP, OPT, OPTREP and Class, and an element generator containing a found Class generator in its subordinate structure and the succeeding generators within the "elements" are restored to their non-evaluated states. An element generator (CHO) other than the aforesaid types does not need a special operation for resetting.

II) Alternative Object Generation Processing . . . After the restoration processing, a candidate alternative to the layout object is generated.

The outline of the alternative object generation algorithm of the alternative object generation processing is to generate a layout object instead of the last generated layout object.

The alternative function of each of the element generators will be described below.

1: SEQ generator

The alternative function is transferred to an element generator corresponding to element information set in the "lastElement". If the generation of a layout object succeeds, the generated layout object is returned as a returned value. If the generation of the layout object fails, "failure" is returned as a returned value. If the result is "obscurity", element information next to the element information set in the "lastElement" is selected from the array of element information held in the "elements". Subsequently, the generate function is transferred to an element generator corresponding to the element information. The obtained result is returned as a returned value.

2: AGG generator

The current pattern set in the "elements" and the information set in the "lastElement" are memorized in the "selectedElements" so as not to again select the same pattern. The array of elements within the "elements" which includes an element corresponding to the information of the "lastElement" and the succeeding elements is altered to generate a new pattern. The new pattern needs to be a pattern which is not recorded in the "selectedElements". The new pattern is set in the "elements", new information is set in the "lastElement", and an "alternative" message is sent to the "lastElement". If the generation of a layout object succeeds, the generated layout object is returned as a returned value. If the generation of the layout object fails, a further new pattern is generated and, subsequently, similar processing is performed. If no new pattern is generated, "failure" is returned as a returned value.

3: CHO generator

The alternative function is transferred to an element generator corresponding to element information set in the "lastElement". If the generation of a layout object succeeds, the generated layout object is returned as a returned value. If the generation of the layout object fails, element information next to immediately previous element information in the array of element information held in the "elements" is selected and set in the "lastElement". Subsequently, the generate function is transferred to an element generator corresponding to the element information. The obtained result is returned as a returned value.

4: OPT generator

The alternative function is transferred to an element generator corresponding to element information set in the "lastElement". If the generation of a layout object succeeds, the generated layout object is returned as a returned value. If the generation of the layout object fails, "obscurity" is returned as a returned value.

5: REP generator

The alternative function is transferred to an element generator corresponding to element information set in the "lastElement". If the generation of a layout object succeeds, the generated layout object is returned as a returned value. In a case where the generation of the layout object fails, if at least one element (layout object) is generated, "obscurity" is returned as a returned value. Otherwise, "failure" is returned as a returned value.

6: OPTREP generator

The alternative function is transferred to an element generator corresponding to element information set in the "lastElement". If the generation of a layout object succeeds, the generated layout object is returned as a returned value. If the generation of the layout object fails, "failure" is returned as a returned value.

7: Class generator

"Failure" is returned as a returned value.

The following description is made in connection with a generation processing operation for generating a specific layout structure from a generic layout structure by using the generators each having the aforesaid generate and alternative functions.

Referring to the outline of generation processing for a specific layout structure, the generator managing unit 3 reads, for example, the generator shown in FIG. 2 from the generator storing unit 10 and temporarily holds it. The generator selecting unit 4 passes an argument to the generator held in the generator managing unit 3, and passes a returned value (layout object) to the specific layout structure converter 5.

It is assumed here that element information indicative of each of the element generators shown in FIG. 2 is defined as follows:

SEQ generator 21="21"
CHO generator 22="22"
OPT generator 26="26"
Class generator 23="23"
Class generator 24="24"
Class generator 25="25"
Class generator 27="27"

Accordingly, "23", "24" and "26" are set in the "elements" of the SEQ generator 21, "23" and "25" in the "elements" of the CHO generator 22, and "27" in the "elements" of the OPT generator 26.

The operation of the generate function will now be described with reference to the diagram of FIG. 3.

Figure 3:
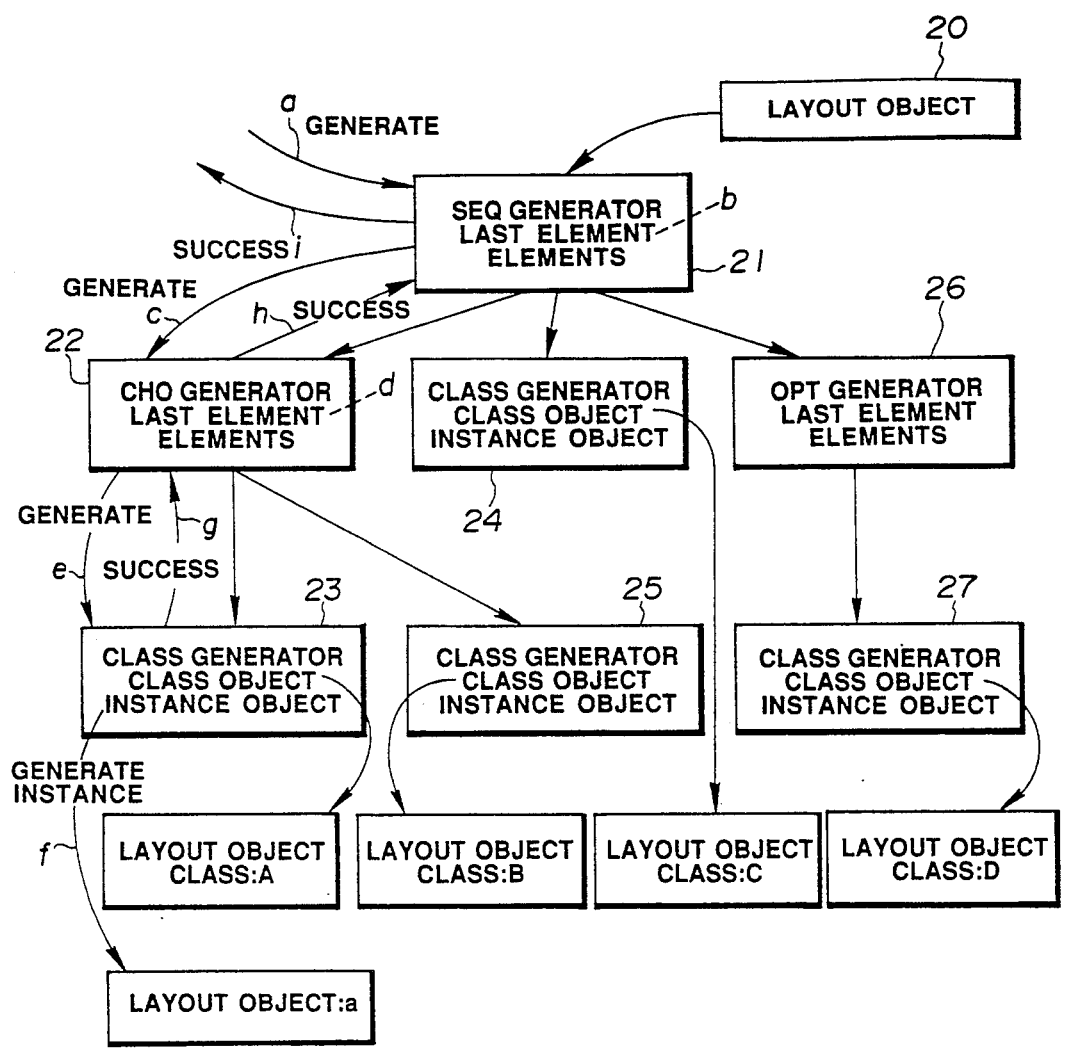
FIGS. 3 to 5 are diagrams for explaining the sequence of processing for generating a specific layout structure from the data structure shown in FIG. 2.

In FIG. 3, symbols a to i correspond to symbols a to i which are used to denote steps which will be described below.

Step a: An instruction indicative of "generate" is sent from the generator selecting unit 4 to the SEQ generator 21.

Step b: Since no information has yet been set in the "lastElement" of the SEQ generator 21, the initial element information set in the "elements" of the SEQ generator 21, i.e., "22", is set in the "lastElement".

Step c: An instruction indicative of "generate" is sent from the SEQ generator 21 to the CHO generator 22.

Step d: Since no information has yet been set in the "lastElement" of the CHO generator 22 either, the CHO generator 22 sets the initial element information set in its "elements", i.e., "23", in its "lastElement".

Step e: The CHO generator 22 sends an instruction indicative of "generate" to the Class generator 23.

Step f: Since no object has yet been set in the "instanceObject" of the Class generator 23, the Class generator 23 generates a new instance, i.e., a layout object a, from its "ClassObject" and sets the layout object a in its "instanceObject".

Step g: The Class generator 23 returns its instance as a returned value to the CHO generator 22.

Step h: The CHO generator 22 returns the received instance to the SEQ generator 21 as a returned value.

Step i: The SEQ generator 21 returns the received instance to the generator selecting unit 4 as a returned value.

An operation for further executing "generate" in the above-described state (in the state wherein the layout object a has been generated) will be described below with reference to the diagram of FIG. 4.

Figure 4:
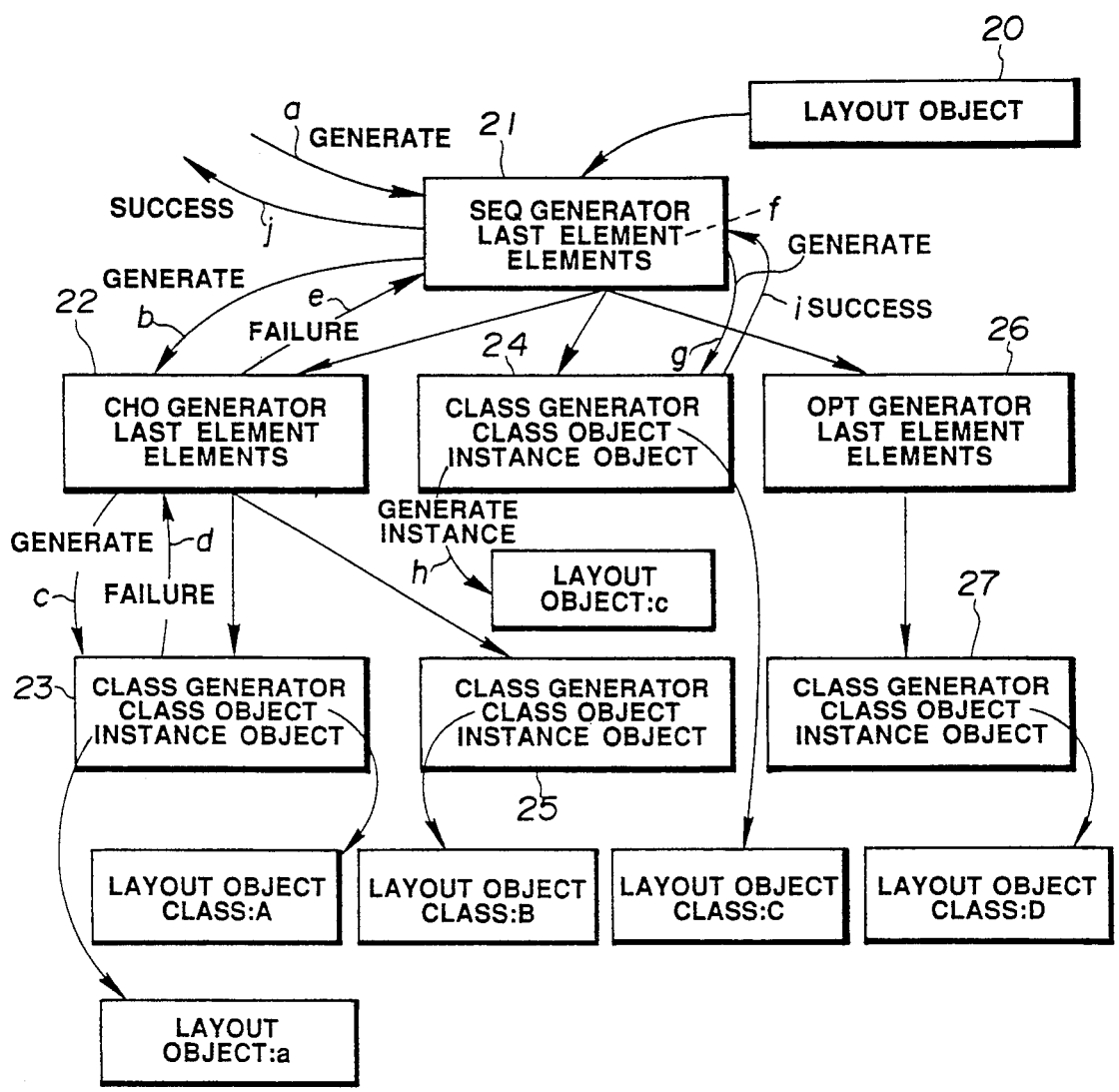

In FIG. 4, symbols a to j correspond to symbols a to j which are used to denote steps which will be described below.

Step a: An instruction indicative of "generate" is sent from the generator selecting unit 4 to the SEQ generator 21.

Step b: Since the element generator set in the "lastElement" of the SEQ generator 21 indicates the CHO generator 22, the SEQ generator 21 sends an instruction indicative of "generate" to the CHO generator 22.

Step c: Since the element generator set in the "lastElement" of the CHO generator 22 indicates the Class generator 23, the CHO generator 22 sends an instruction indicative of "generate" to the Class generator 23.

Step d: Since the "instanceObject" of the Class generator 23 has been set, the Class generator 23 returns "failure" to the CHO generator 22 as a returned value.

Step e: The CHO generator 22 which has received the result also returns "failure" to the SEQ generator 21 as a returned value.

Step f: The SEQ generator 21 which has received the result selects "24", i.e., element information next to the element information ("22") set in the "lastElement", from the "elements", and sets "24" in the "lastElement".

Step g: The SEQ generator 21 sends an instruction indicative of "generate" to the Class generator 24 corresponding to "24".

Step h: Since the "instanceObject" of the Class generator 23 has not yet been set, the Class generator 24 generates a new instance, i.e., a layout object c, from its "ClassObject" and sets the layout object c in the "instanceObject".

Steps i to j: The instance (layout object c) is returned as a returned value from the Class generator 24 to the generator selecting unit 4 through the SEQ generator 21.

The processing operation of the generator which generates an object alternative to the layout object a in the above-described state (the state where the layout objects a and c have been generated) will be described below with reference to the diagram of FIG. 5.

Figure 5:
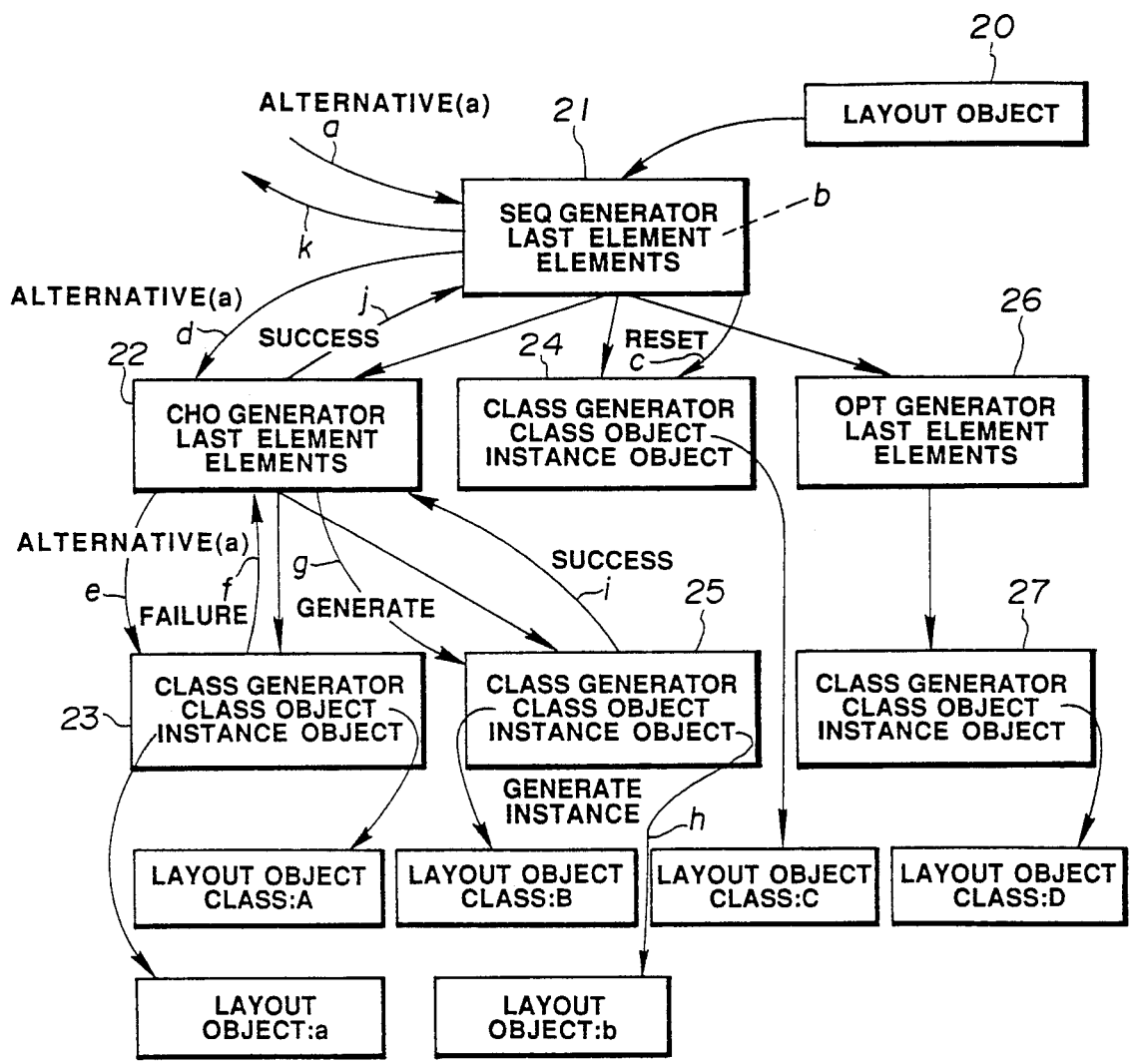
Figure 6:
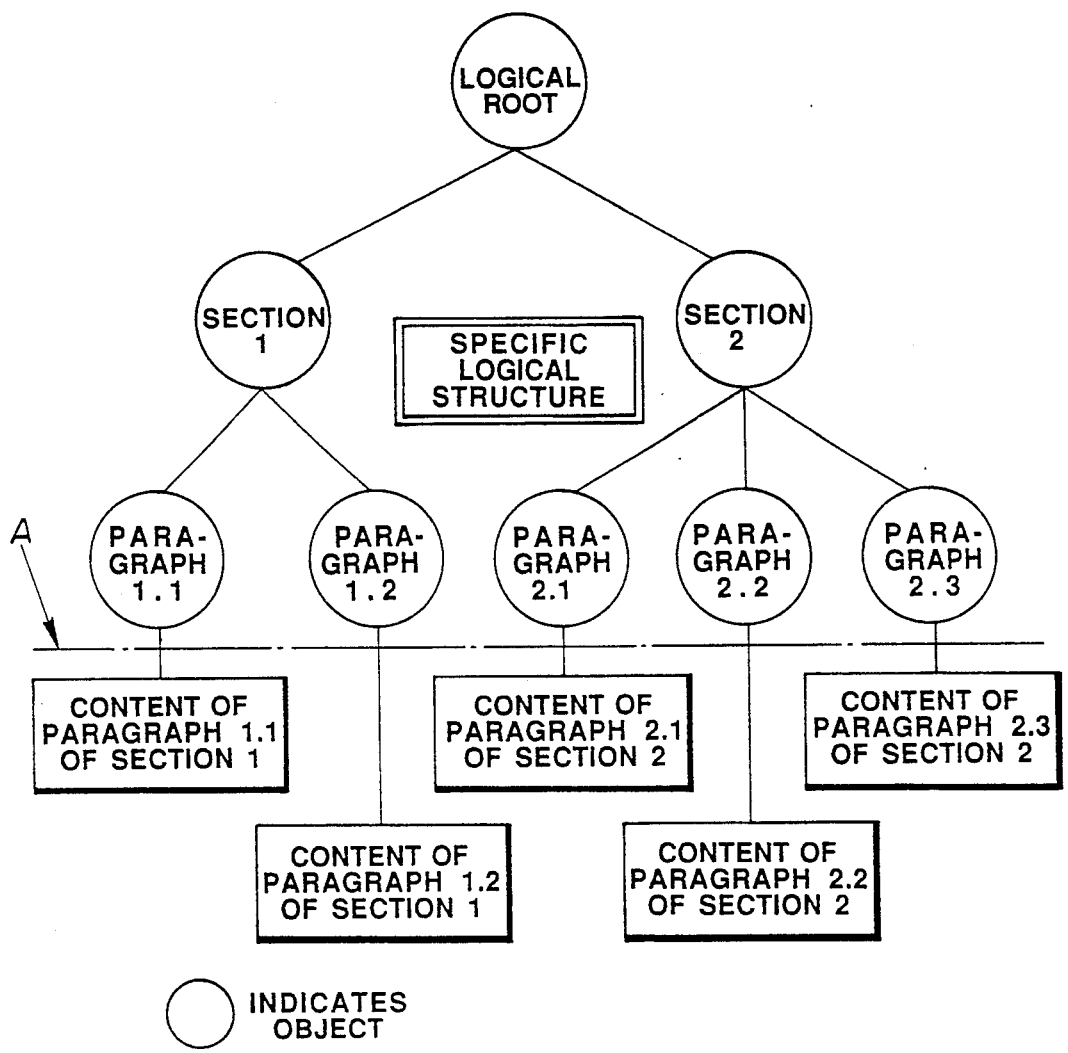
FIG. 6 is a diagram showing one example of a specific logical structure in the ODA (office document architecture)
Figure 7:
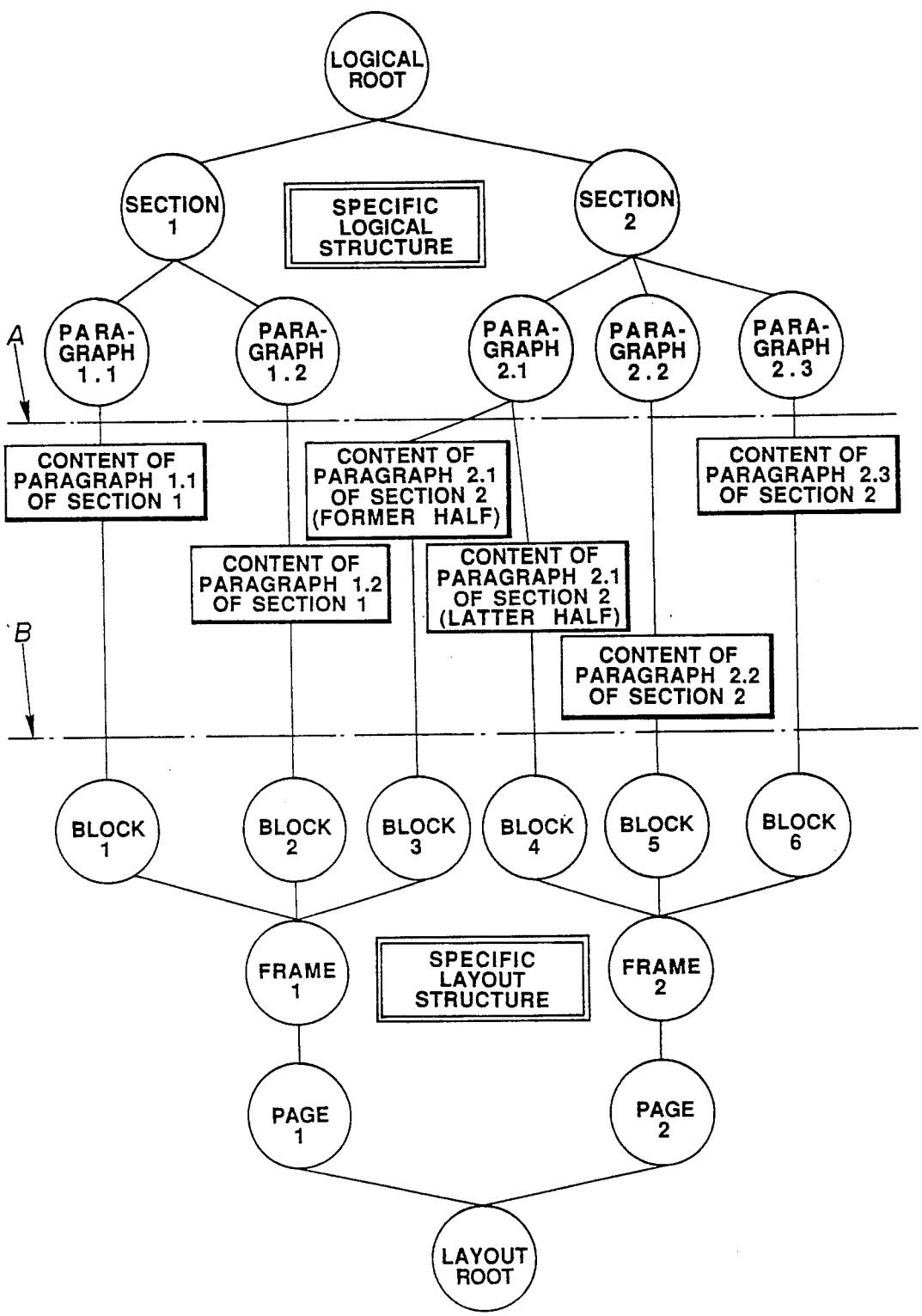
FIG. 7 is a diagram showing the correspondence between the specific logical structure and a specific layout structure in the ODA.

In FIG. 5, symbols a to k correspond to symbols a to k which are used to denote steps which will be described below.

Step a: An instruction indicative of "alternative" (the layout object a as an argument) is sent from the generator selecting unit 4 to the SEQ generator 21.

Step b: The Class generator 23 which has generated the layout object a is searched in the subordinate structure (subordinate element generators) of the SEQ generator 21.

Step c: "Superiors" are traced from the Class generator 23 to the generator 21 positioned at the root, and the Class generator 23 is restored to the state wherein it was placed immediately after it had been evaluated.

During the above-described restoration, c1) Neither the Class generator 23 nor the CHO generator 22 performs anything.

c2) Since "21" indicates the SEQ generator 21, "22" is set in the "lastElement" of the generator 21 and the internal states (lastElement) of a generator corresponding to "22" and succeeding generators in the "elements" are restored to their non-evaluated states.

In other words, the internal state of a generator corresponding to each element information "24" and "26" in the "elements" is reset. In FIG. 5, since the internal state of the Class generator 24 has been reset, the layout object c generated by the Class generator 24 is deleted.

Step d: The SEQ generator 21 sends an instruction indicative of "alternative" to the CHO generator 22 corresponding to "22" set in the "lastElement" of the SEQ generator 21.

Step e: The CHO generator 22 sends an instruction indicative of "alternative" to the Class generator 23 corresponding to "23" set in the "lastElement" of the CHO generator 22.

Step f: Since the Class generator 23 cannot generate a different candidate, it returns "failure" to the CHO generator 22 as a returned value.

Step g: The CHO generator 22, which has received "failure", generates a different candidate.

During the generation of this different candidate, g1) The CHO generator 22 selects element information "25" set in the "lastElement" from its "elements" and sets this "25" in the "lastElement".

g2) The CHO generator 22 sends an instruction indicative of "generate" to the Class generator 25.

Step h: Since the "instanceObject" of the Class generator 25 has not yet been set, the Class generator 25 generates a new instance, i.e., the layout object b, from its "ClassObject" and sets the layout object b in the "instanceObject".

Steps i to k: The instance (layout object b) is returned as a returned value from the Class generator 25 to the generator selecting unit 4 through the CHO generator 22 and the SEQ generator 21.

The aforesaid steps a to c constitute a restoration algorithm, and the aforesaid steps d to k constitute an alternative-object generation algorithm.

Another embodiment of the present invention will be described below with reference to FIGS. 10 to 12(a)–12(d).

The following description is given of processing which is executed to obtain the specific layout structure shown in FIG. 12(c) instead of the specific layout structure of FIG. 11(a) which was obtained on trial on the basis of the limitations of the generic layout structure shown in FIG. 10 but which failed to be laid out.

In the case of a failure in the layout of the layout object c of the specific layout structure shown in FIG. 11(a), the controller 7 recognizes the layout object a positioned at a level superior to the failed layout object c. The GFS of the layout object a contains the structure expression (CHO C D).

The controller 7 generates a generator on the basis of the structure expression (CHO C D) and determines whether there is a subordinate structure (layout object) which can be generated in association with the layout object a on the basis of the generator. In this case, since the layout object d can be generated instead of the layout object c (refer to FIG. 10), the layout object c is deleted to generate the layout object d.

Accordingly, in this example, the specific layout structure shown in FIG. 2(c) is obtained instead of the specific layout structure shown in FIG. 11(a), and the generation of the specific layout structure shown in FIG. 12(a) can be omitted.

As is apparent from the foregoing description, in accordance with the present embodiment, since a data structure (generator) is generated which corresponds to a subordinate structure which can be generated as a structure subordinate to a certain layout object (element), it is possible to easily know what subordinate element is generated in association with the certain layout object.

If a layout failure occurs, it is determined whether there is an immediately subordinate structure which can be generated in association with a layout object positioned at a level superior to a layout object which has caused the layout failure. If there is such an immediately subordinate structure, the subordinate structure (layout object) is generated. Accordingly, it is possible to restrain generation and deletion of unnecessary layout objects. In other words, it is possible to rapidly effect retry processing for layout, whereby an overhead can be decreased.

In consequence, it is possible to rapidly generate a layout structure corresponding to a particular document.

Although in the above-described embodiment the document layout processing device according to the present invention is applied to an apparatus for performing layout processing based on the ODA, the present invention is not limited to such an apparatus and is also applicable to other kinds of apparatus.

The present invention is applicable to, for example, a document processing apparatus, a word processor, a form processing apparatus, a data base system or the like.

More specifically, the document layout processing device according to the present invention can be applied to a document processing apparatus or a word processor which receives an input document (the logical structure and content thereof), lays out the document content and outputs the laid out document to an output device such as a display or a printer in accordance with the operation of an input device such as a keyboard or a mouse by a user or a system. It is, therefore, possible to rapidly effect processing for laying out the document content inputted by the user and converting it into information which can be visualized.

The document layout processing device according to the present invention can also be applied to the form processing apparatus having the function of processing data stored in the apparatus or data received by data communication, automatically formulating a new form, laying out the form in a predetermined layout form, and displaying it on the display screen of a display unit or printing it on paper by a printer. It is, therefore, possible to rapidly effect processing for laying out the processed form content and converting it into information which can be visualized.

The document layout processing device according to the present invention can also be applied to the data base system which executes a search in response to an inquiry inputted by the operation of a terminal by a user and displays the search result on the display screen of a display unit or prints it on a paper by a printer. It is, therefore, possible to rapidly effect processing for laying out the content of the search result and converting them into information which can be visualized.

As described above, in accordance with the present invention, when a specific layout structure is to be generated, a data structure corresponding to a subordinate structure which can be generated in a generic layout structure is generated in association with a superior element having the subordinate structure, and a subordinate structure is selected on the basis of the data structure. If a failure occurs in layout, an immediately subordinate element which can be generated in association with a superior element which has caused the failure is preferentially selected on the basis of a data structure corresponding to such a superior element, and a layout retry is performed. Accordingly, it is possible to restrain generation and deletion of an unnecessary layout object, whereby it is possible to rapidly effect layout processing.

Various modifications may be made without departing from the true scope and spirit of the present invention, and the foregoing description of the embodiment is solely for the purpose of illustration and is not to be construed as limiting the scope of the present invention. The scope of the present invention is defined by the appended claims and is not limited by the description hereof. To the contrary, the present invention is intended to cover all various modifications and equivalent variations included within the scope of the appended claims.

What is claimed is:

1. A document layout processing device comprising:
   generating means for generating a data structure corresponding to a subordinate structure in association with a superior element having the subordinate structure, the subordinate structure including at least one element which can be generated as an element immediately subordinate to the superior element among elements which constitute a layout structure common to a plurality of documents, and for generating a data structure corresponding to a structure subordinate to a superior structure including a certain superior element as an immediately subordinate element if it is impossible to generate an element immediately subordinate to the certain superior element;
   memory means for memorizing the data structure; and
   selecting means for selecting an element immediately subordinate to the superior element on the basis of the memorized data structure and a content of a document to be laid out.

2. A document layout processing device according to claim 1, wherein if a failure occurs in layout, said selecting means preferentially selects an immediately subordinate element which can be generated in association with a superior element which has caused the failure, on the basis of a data structure corresponding to the superior element.

3. A document layout processing device comprising:
generating means for generating a data structure corresponding to a structure expression which is associated with a layout object class in a layout structure common to a plurality of documents, which is one attribute of the layout object class, and which represents a limitation of a subordinate structure which can be immediately linked to a layout object belonging to the layout object class;
memory means for memorizing the data structure generated by said generating means; and
selecting means for selecting an immediately subordinate element on the basis of a data structure memorized in said memory means, in accordance with a particular document content to be laid out;
if a failure occurs in layout, said selecting means preferentially selecting an immediately subordinate element which can be generated in association with a superior element which has caused the failure, on the basis of a data structure corresponding to the superior element.

4. A document layout processing device according to claim 3, wherein said generating means generates a data structure which is associated with each element constituting the structure represented by the structure expression and which includes a functional unit having a function for generating a new layout object subordinate to a layout new object and a functional unit having a function for generating a layout object alternative to a layout object which has already been generated at a level subordinate to the layout object.

5. A document layout processing device according to claim 4, wherein each of said functional units has a function for holding a generation history of the new layout object which has been generated at the level subordinate to the layout object.

6. A document layout processing device according to claim 4, wherein the functional units includes a first functional unit associated with a subordinate-element generator and a second functional unit associated with a layout object class, the first functional unit including a first holding unit for holding information indicative of a functional unit immediately subordinate to the first functional unit, a second holding unit for holding information indicative of a currently selected immediately subordinate functional unit from among the information held in the first holding unit, and a third holding unit for holding information indicative of a functional unit immediately superior to the first functional unit, the second functional unit including a holding unit for holding a layout object class to which a layout object to be generated belongs and a holding unit for holding an instance.

7. A specific layout structure generating method in a structured document layout processing, in which a specific layout structure corresponding to a logical structure of a specific structured document is generated on the basis of the specific structured document, the logical structure of the specific structured document and a layout structure common to a plurality of structured documents including the specific structured document, the method comprising the steps of:
generating a data structure corresponding to a subordinate structure and holding information on generation of the subordinate structure and information on a selection history of a subordinate element, in association with a superior element having the subordinate structure composed of at least one generatable element immediately subordinate to the superior element among elements constituting the layout structure common to the plurality of structured documents and memorizing the generated data structure; and
selecting an element immediately subordinate to the superior element on the basis of the memorized data structure and part of contents of the specified structured document to be laid out.

8. A specific layout structure generating method in a structured document layout processing, in which a specific layout structure corresponding to a logical structure of a specific structured document is generated on the basis of the specific structured document, the logical structure of the specific structured document a layout structure common to a plurality of structured documents including the specific structured document, the method comprising the steps of:
generating a data structure corresponding to a subordinate structure and holding information on generation of the subordinate structure and information on a selection history of a subordinate element, in association with a superior element having the subordinate structure composed of at least one element which can be generated as an element immediately subordinate to the superior element among elements constituting the layout structure common to the plurality of structured documents and memorizing the generated data structure;
selecting an element immediately subordinate to the superior element on the basis of the memorized data structure and part of contents of the specific structured document to be laid out; and
if a failure occurs in layout of the selected subordinate element, selecting a second generatable element immediately subordinate to the superior element on the basis of a data structure corresponding to the superior element which is superior to the selected subordinate element.

9. A specific layout structure generating method in a structured document layout processing, in which a specific layout structure corresponding to a logical structure of a specific structured document is generated on the basis of the specific structure document, the logical structure of the specific structured document a layout structure common to a plurality of structured documents including the specific structured document, the method comprising the steps of:
generating a data structure corresponding to a subordinate structure and holding information on generation of the subordinate structure and information on a selection history of a subordinate element, in association with a superior element having the subordinate structure composed of at least one element which can be generated as an element immediately subordinate to the superior element among elements constituting the layout structure common to the plurality of structured documents and memorizing the generated data structure;
selecting an element immediately subordinate to the superior element on the basis of the memorized data structure and part of contents of the specific structured document to be laid out; and
if it is possible to generated an element immediately subordinate to the superior element, generating a data structure corresponding to a subordinate structure of a second superior element which includes the superior element as an immediately subordinate element.

10. A specific layout structure generating method in a structured document layout processing, in which a specific layout structure corresponding to a logical structure of the specific structured document is generated on the basis of the specific structured document composed of a plurality of document parts, the logical structure of the specific structured document and a layout structure composed of a plurality of layout objects, the layout structure being a regulation for limiting a positional relationship among the plurality of document parts constituting contents of the specific structured document and being common to a plurality of structured documents including the specific structured document, the method comprising the steps of:

generating a data structure which corresponds to a subordinate structure and holds information on generation of the subordinate structure and information on a selection history of a subordinate element, in association with a layout object class having the subordinate structure composed of at least one element which can be generated as an element immediately subordinate to the layout object class among layout object classes constituting the layout structure common to the plurality of structured documents, the data structure corresponding to a structure expression which is one of attributes that the layout object class has and which represents limitation of the structure immediately subordinate to a layout object belonging to the layout object class, the data structure being generated in correspondence with the layout object class;

memorizing the generated data structure; and selecting an element immediately subordinate to the layout object class on the basis of the memorized data structure and a document part of the specific structured documents to be laid out.

11. A device for generating a specific layout structure, in which a specific layout structure corresponding to a logical structure of a specific structured documents is generated on the basis of the specific structured document, the logical structure of the specific structured document and a layout structure common to a plurality of structured documents including the specific structured document, the device comprising:

generating means for generating a data structure corresponding to a subordinate structure and holding information on generation of the subordinate structure and information on a selection history of a subordinate element, in association with a superior element having the subordinate structure composed of at least one element which can be generated as an element immediately subordinate to the superior element among elements constituting the layout structure common to the plurality of structured documents.

memory means for storing the data structure generated by the generating means; and selecting means for selecting an element immediately subordinate to the superior element on the basis of the data structure stored in the memory means and the content of the specific structured document.

12. The device according to claim 11, wherein the memory means comprises a readable/writable memory.

* * * * *